UNITED STATES PATENT OFFICE.

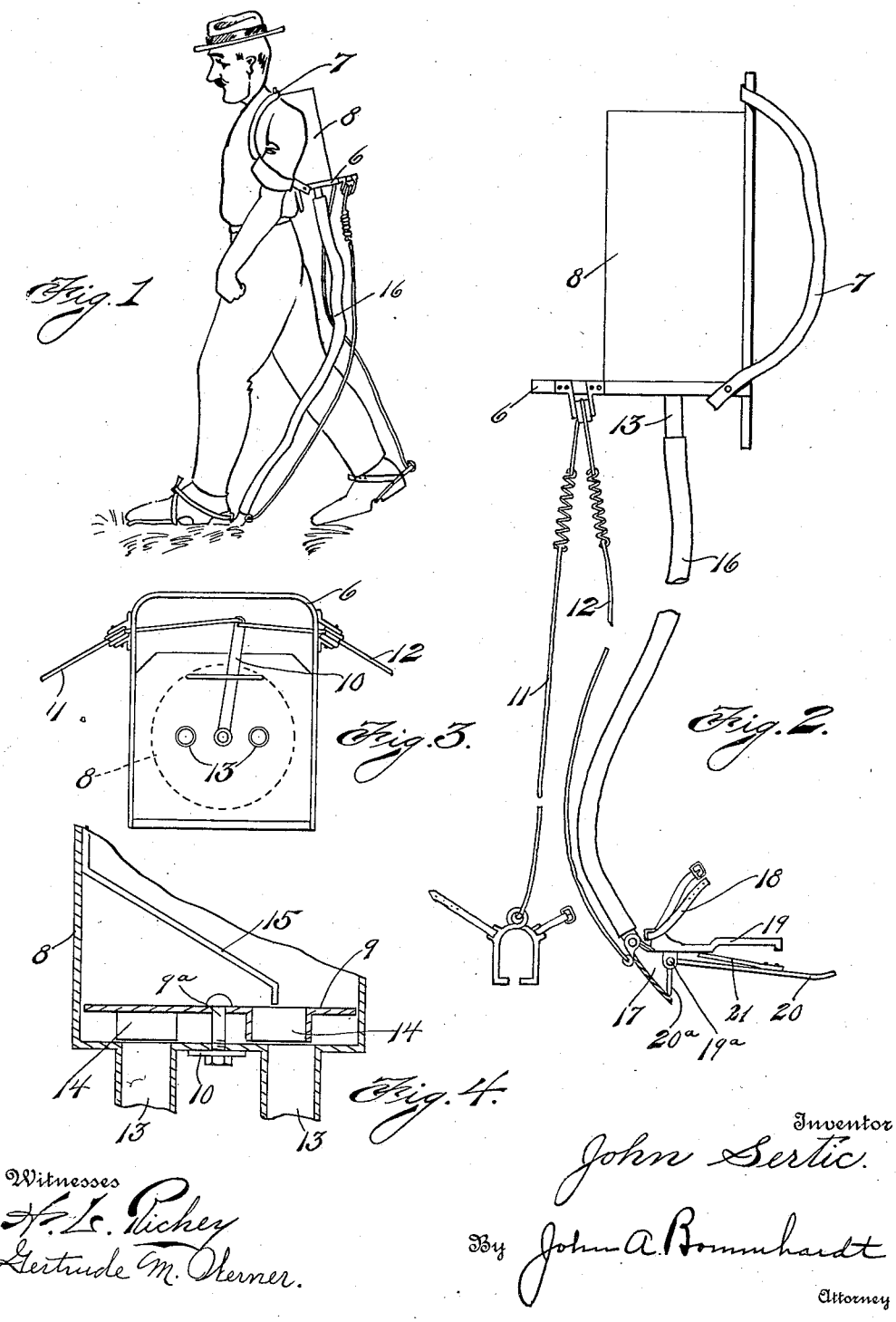

JOHN SERTIC, OF CLEVELAND, OHIO.

CORN-PLANTER.

1,084,564.  Specification of Letters Patent.  Patented Jan. 13, 1914.

Application filed September 16, 1913. Serial No. 790,006.

*To all whom it may concern:*

Be it known that I, JOHN SERTIC, a subject of Emperor Franz-Joseph of Austria-Hungary, residing at Cleveland, in the county of Cuyahoga and State of Ohio, have invented certain new and useful Improvements in Corn-Planters, of which the following is a specification.

This invention relates to a planter, especially adapted for planting corn or other grains, and of that type in which the seed box is attached to the back of a man, and has a spout or tube leading to a shoe which is attached to the foot of the man and which acts to drop the grain at each step, the shoe of the planter being provided with a valve which opens at each step, and the flow of grain from the said box to the spout being controlled by a valve in the bottom of the said box, this valve being operated by a connection to the other foot of the man.

The invention is illustrated in the accompanying drawings, in which—

Figure 1 is a side elevation of the device illustrating the manner of its use. Fig. 2 is a side elevation of the device, partly in section. Fig. 3 is a top view showing the lever which operates the seed box valve and Fig. 4 is a detail in section of the seed valve.

Referring specifically to the drawings, 6 indicates an angular bracket which is carried on the back of the man by shoulder straps 7. 8 is the seed box resting on the bracket. This has a valve plate 9 in the bottom thereof, pivoted at 9ª, and worked by a lever 10 which is pulled one way or the other by cords 11 and 12 fastened to the respective feet of the man. The bottom of the box 8 has outlet tubes 13, one or both of which may be used, according to whether the planting is to be done at each step or at alternate steps. Guide plates 14 direct the seed from the valve plate 9 to the tubes 13, and act to allow only a certain amount of seed to pass. The box has a hopper bottom 15 above the valve plate. A flexible hose 16 extends from the tube 13 to the foot operated device or shoe, which comprises a hollow shoe 17 adapted to be thrust into the ground by the pressure of the foot to which it is fastened by means of a strap 18 and sole plate 19. A lever 20 is pivoted at 19ª to the bottom of the sole plate, and one end of the lever forms a gate 20ª at the outlet from the shoe 17. A spring 21 normally holds the gate closed. When the weight of the man is placed on the shoe, the latter is forced into the ground, and the contact of the front end of the lever 20 with the ground swings the same and opens the gate 20ª which allows the seed in the shoe 17 to fall into the hole made by the shoe. The lever 10 is connected on one side by the cord 11 to one foot of the man, and by the cord 12 to the other foot, and as the man steps the valve 9 is first turned one way and opened, and then turned the other way and closed, so that at each step a quantity of seed falls into the tube 13 and thence to the planting shoe. When two shoes are used, one is attached to each foot, and two tubes 16 are provided. When only one shoe is used, as shown in Fig. 1, the idle tube 13 may be closed by any suitable plug or the like.

By the means described, planting may be effected by the act of walking across the field, the grain being dropped into hills either one or two steps apart.

It will be noticed that the shoe 17 is located under the heel of the man's foot, and the front end of the lever 20 is under the toe, so that the heel first strikes and thrusts the shoe in the ground, and then as the toe is brought down the lever 20 is operated, opening the gate and allowing the seed to fall and then withdrawing the shoe from the ground.

Having described my invention, what I claim as new and desire to secure by Letters Patent, is—

1. In a foot operated corn planter, the combination of a sole plate, a planting shoe attached thereto, a gate and lever controlling the outlet from the shoe and pivoted at the under side of the shoe so that the lever will strike the ground and open the gate at each step, and a spring attached to the lever, to close the gate.

2. In a foot operated corn planter, the combination of a planting shoe provided with means for attaching the same under the heel of the foot, a spring gate controlling the outlet from the shoe, and an operating lever connected to the gate, and extending forwardly under the foot to the toe thereof, whereby the shoe is first driven into the ground by the heel impact, and the lever then strikes the ground and opens the gate as the toe descends.

3. In a foot operated corn planter, the combination of a seed box adapted to be attached to the back of a man and provided with an outlet tube, a planting device at the lower end of the tube, adapted for attachment to a foot, an oscillating feed valve between the box and tube, a lever connected to the valve, and cords attached to the lever and adapted to be connected to the feet of the man, to operate the valve.

In testimony whereof I do affix my signature in presence of two witnesses.

JOHN SERTIC.

Witnesses:
 JOHN A. BOMMHARDT,
 F. M. TAGGETT.

Copies of this patent may be obtained for five cents each, by addressing the "Commissioner of Patents, Washington, D. C."